United States Patent [19]

Konishi et al.

[11] Patent Number: 5,594,242

[45] Date of Patent: Jan. 14, 1997

[54] POSITION DETECTING APPARATUS WHICH USES A CONTINUOUSLY MOVING LIGHT SPOT

[75] Inventors: Yoshikazu Konishi; Shigeyuki Akimoto, both of Tokyo, Japan

[73] Assignee: Kabushiki Kaisha Topcon, Japan

[21] Appl. No.: 296,936

[22] Filed: Aug. 31, 1994

[30] Foreign Application Priority Data

Sep. 9, 1993 [JP] Japan .................................. 5-247308

[51] Int. Cl.⁶ .................................................. G01J 1/20
[52] U.S. Cl. ...................... 250/234; 250/201.3; 250/235; 356/375
[58] Field of Search ....................... 250/201.3, 234–235, 250/559.4; 356/375, 383, 31

[56] References Cited

U.S. PATENT DOCUMENTS

| | | | |
|---|---|---|---|
| 4,203,031 | 5/1980 | Kamachi et al. | 250/201.3 |
| 4,336,997 | 6/1982 | Ross et al. | 250/201.3 |
| 4,861,982 | 8/1989 | Smid et al. | 250/235 |
| 4,958,920 | 9/1990 | Jorgens et al. | 250/201.3 |

*Primary Examiner*—Stephone Allen
*Attorney, Agent, or Firm*—Ronald P. Kananen

[57] ABSTRACT

A position detecting apparatus projects a light beam to form a light spot within a certain range on an object under test by means of a light source, collimator lens, pinhole plate, half-mirror, and objective lens included in it. The apparatus further includes a deflecting prism which deflects the light spot relative to the object continuously so that the light spot has a circular or ellipsoidal locus of movement on the object, and a first and second light sensors which receive a reflected light beam from the object at positions short of and ahead of the convergent position of the reflected light beam. The apparatus determines that the object is located at the reference position if the outputs of the first and second light sensors thin a certain period of spot scanning are substantially equal.

20 Claims, 5 Drawing Sheets

POSITION DETECTING APPARATUS WHICH USES A CONTINUOUSLY MOVING LIGHT SPOT

BACKGROUND OF THE INVENTION

1. Field of the Invention

The present invention relates to a position detecting apparatus used for an automatic focusing (auto-focusing) mechanism or the like.

2. Description of the Prior Art

Accurate and quick position detection is indispensable for an auto-focusing mechanism. Among a variety of conventional position detecting apparatus used for the focusing operation, typical ones are based on the use of a light spot or the contrast of an image.

The former apparatus using a light spot has its measuring light beam dispersed by a rough or corrugated work surface, and therefore the accurate position detection is difficult when a workpiece has a poor surface condition.

The latter apparatus using the contrast of an image operates to project a stripe pattern onto the work surface and detect the contrast of the image by means of a photodiode array or CCD camera. The apparatus is designed to process the image signal of the projected stripe pattern while varying the distance between the workpiece and the optical device, e.g., microscope, thereby implementing the position detecting and focusing operations. This apparatus has a drawback of an extended measurement time before the system is finally brought in focus.

SUMMARY OF THE INVENTION

An object of the present invention is to provide a position detecting apparatus capable of detecting accurately and quickly the value and direction of deviation of an object under test from the reference position.

The present invention resides in a position detecting apparatus in which a measuring light spot formed on an object under test is moving generally continuously. Preferably, the light spot moves along a curving profile such as a circle or ellipsoid on the object at a constant angular velocity. The inventive position detecting apparatus bases the position detecting operation on reflected light beam components from various portions of the object, resulting in an enhanced accuracy of measurement.

DESCRIPTION OF THE PREFERRED EMBODIMENTS

The first embodiment of this invention will be explained with reference to the drawings.

Figure 1:
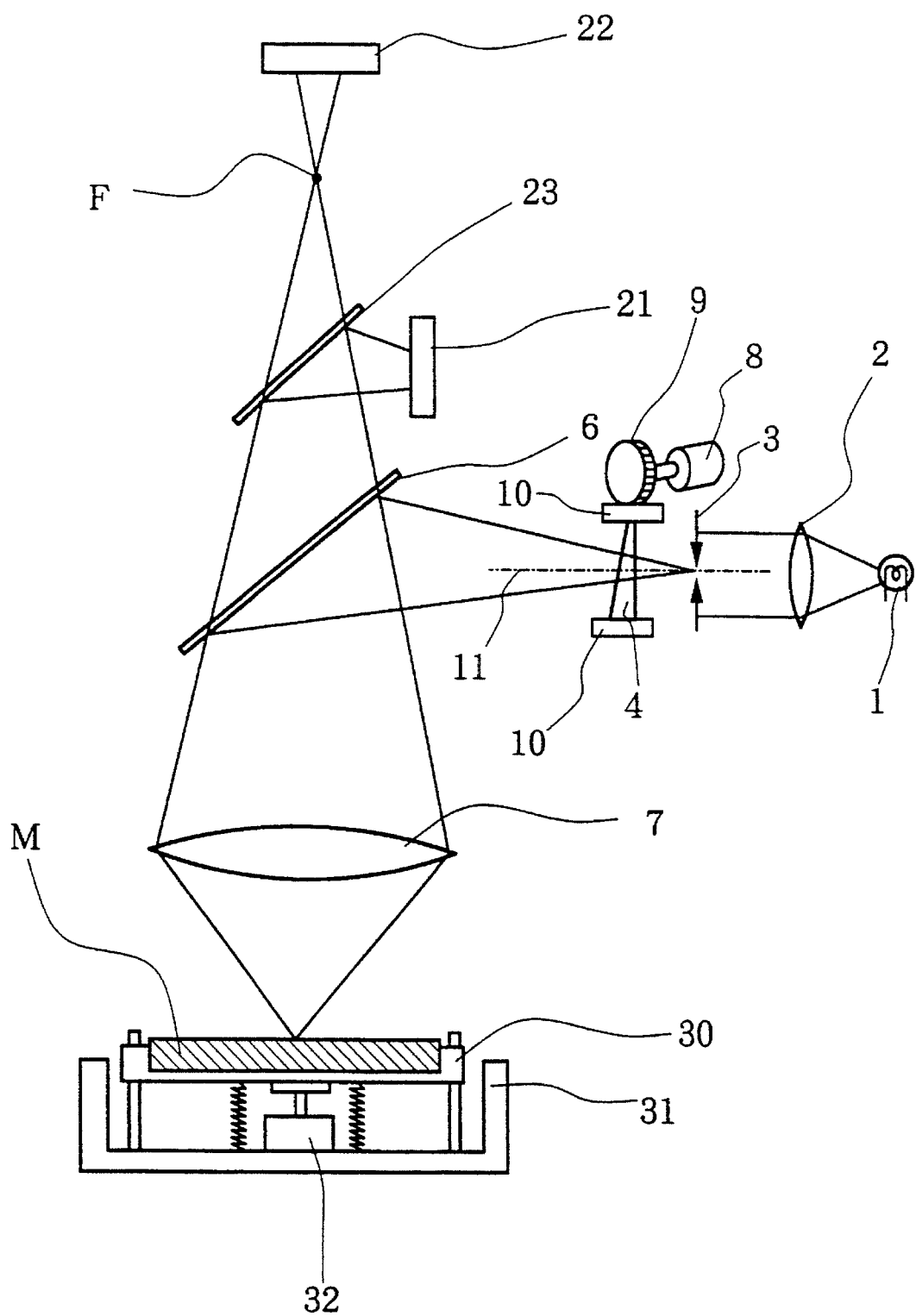
FIG. 1 is a diagram showing a first embodiment of this invention.

In FIG. 1, a light source 1 produces light, which is collimated by a collimator lens 2 and projected onto a pinhole plate 3. A light beam comming out of the pinhole is deflected by a deflecting prism 4 and thereafter reflected by a half-mirror 6. An objective lens 7 focuses the reflected light beam to form a light spot S on the surface of an object M under test.

Figure 3:
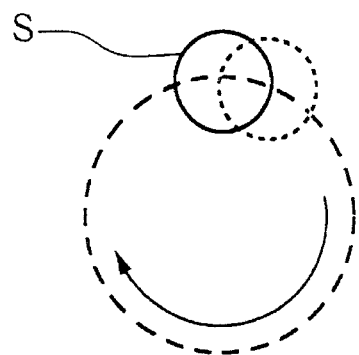
FIG. 3 is a plan view showing the movement of the measuring light spot on the object shown in FIG. 1.

The deflecting prism 4 is provided with an annular gear 10 around its circumuference to engage with a gear 9 which is coupled to a motor 8 so that the prism 4 rotates about the optical axis 11. The rotation of the deflecting prism 4 varies the deflecting direction of the light beam passing through it, and consequently the light pot S has a circular locus on the object M as shown in FIG. 3. Namely, the motor 8 rotates the deflecting prism 4 at a constant speed about the optical axis 11, and the light spot S formed on the object M has a circular movement at a constant angular velocity.

A first light sensor 21 and second light sensor 22 receive a reflected light beam from the surface of the object M.

In this embodiment, the rotational deflecting prism 4 functions as "scanning means", the light source 1, collimator lens 2, pinhole plate 3, half-mirror 6 and objective lens 7 in combination function as "optical projection means", and the first and second light sensors 21 and 22 function as "light sensing means".

The first and second light sensors 21 and 22 have their positional relationship set as follows. When the object M is placed at the reference position, causing a reflected light beam from the object surface to be converged at a position F, the first light sensor 21 is disposed such that it receives the reflected light beam at a position with a certain distance short of the convergent position F and the second light sensor 22 is disposed such that it receives the reflected light beam at a position with the same distance ahead of the convergent position F. In this case, the first light sensor 21 received the reflected light beam from the object M by way of a half-mirror 23.

The object M under test is placed on a stage 30, which is moved by a motor 32 in the direction of optical axis (z-axis direction) relative to a chassis 31. Instead of moving the stage 30, the optical system may be moved relative to the object M.

Figure 2:
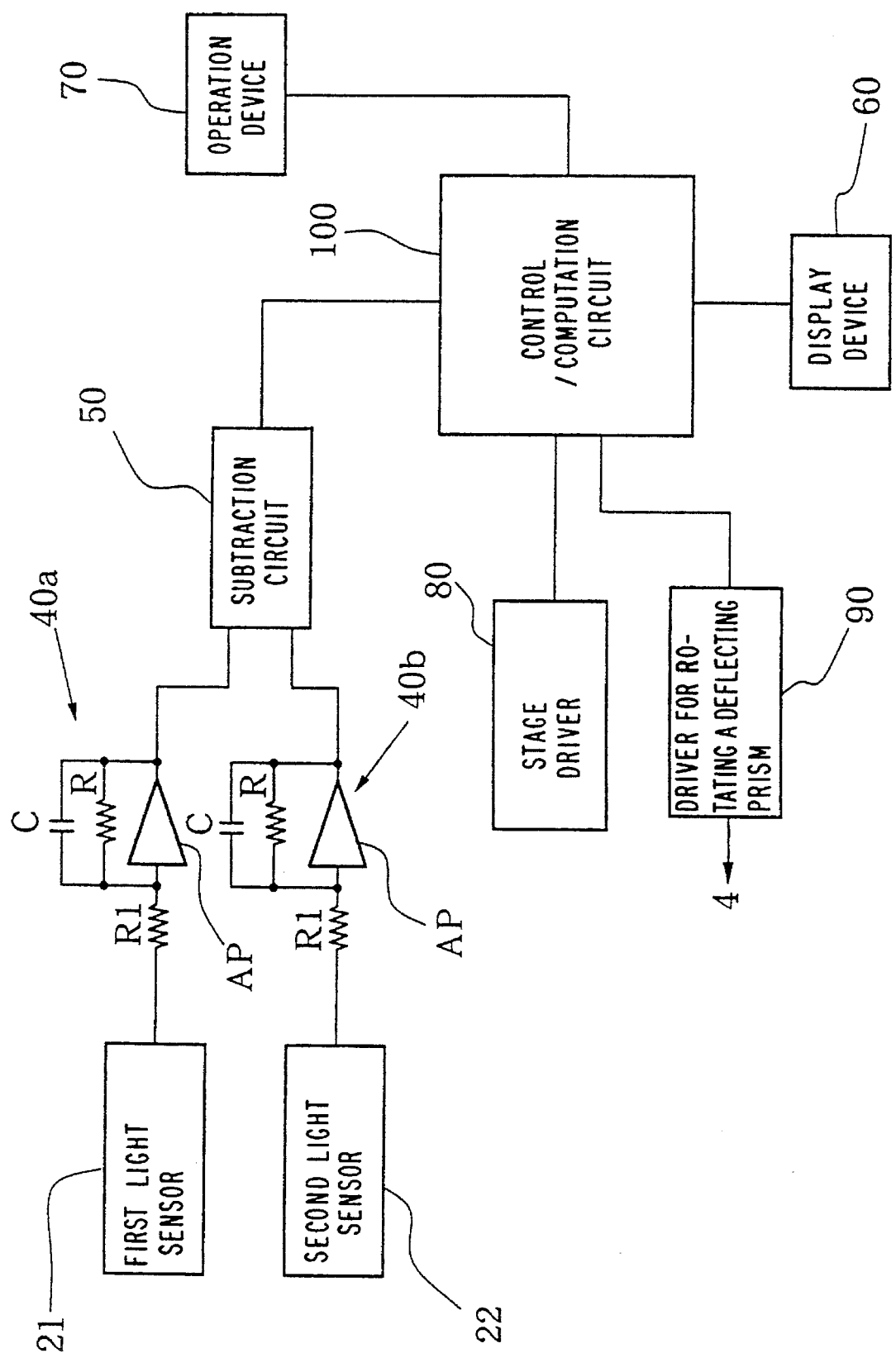
FIG. 2 is a block diagram showing the arrangement for the signal processing of the first embodiment.

Next, an embodiment of position determination means will be explained. Initially, the method of processing for the outputs of the first and second light sensors 21 and 22 will be explained with reference to the block diagram of FIG. 2.

Integration circuits 40a and 40b, each consisting of an amplifier AP, resistors R and R1 and a capacitor C, integrate the outputs of the first light sensor 21 and second light sensor 22, respectively, and have their output terminals connected to a subtraction circuit 50.

Figure 4:
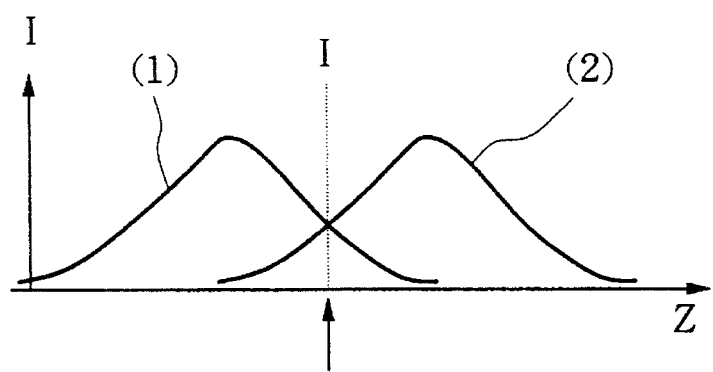
FIG. 4 is a graph showing an example of the outputs of the first and second light sensors shown in FIG. 1 and FIG. 2.

The first and second light sensors 21 and 22 produce outputs having distributions in terms of the output level plotted on the vertical coordinate against the position on the optical axis (z-axis direction) on the horizontal coordinate as shown in FIG. 4. The arrow mark in FIG. 4 indicates the reference position.

The integration circuits 40a and 40b have their time constant ($\tau = C \times R$) set preferably longer than the period T of revolution of the deflecting prism 4 so that the accuracy of position detection is enhanced by using reflected light beams from a wide area of the object.

Although the integration time constant τ may be set shorter than the rotational period T, it is necessary to choose the value of τ within the range for obtaining a sufficient detection accuracy through the summation of signal components derived from different portions of the object.

The integration circuits 40a and 40b have their outputs fed to the subtraction circuit 50, which subtracts the integrated output of the signal (shown by (2) in FIG. 4) of the second light sensor 22 from the integrated output of the signal (shown by (1) in FIG. 4) of the first light sensor 21 and delivers the result to a control/computation circuit 100.

Figure 5:
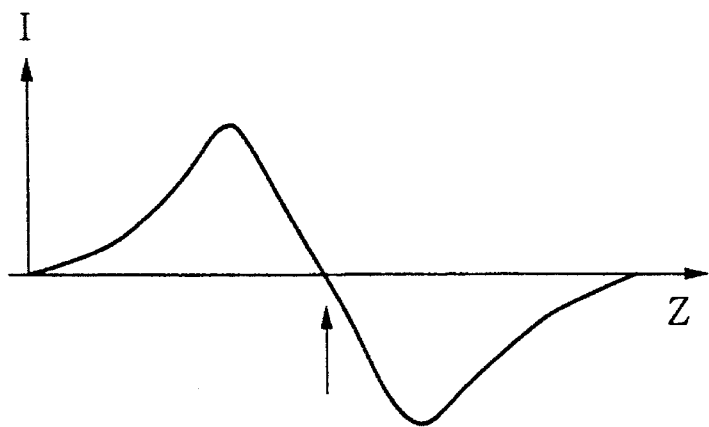
FIG. 5 is a graph showing the result of subtraction of the light sensor outputs shown in FIG. 4.

FIG. 5 shows the output signal of the subtraction circuit 50. The arrow mark in FIG. 5 indicates the reference position. The subtraction circuit 50 produces a zero output when the object M is located at the reference position.

The subtraction circuit 50 has its output terminal connected to the control/computation circuit 100, which discriminates the position of the object M based on the output of the subtraction circuit 50 as follows. The control/computation circuit 100 judges that the object M is located short of the reference position if the subtraction output is a positive value, or it is located at the reference position if the output is zero, or it is located ahead of the reference position if the output is a negative value. A proportional relation between the value of deviation of the object M from the reference position and the output of the subtraction circuit 50 is measured in advance, and the control/ computation circuit 100 evaluates the deviation of the object position based on the absolute value of the subtraction output.

The control/computation circuit 100 operates on a display device 60 to display the value and direction of deviation of the object M from the reference position. It also sends a command to an operation device 70 based on the result of judgement so that a stage driver 80 is activated to move the object M to the reference position automatically or when necessary.

The control/computation circuit 100 controls a prism driver 90 to rotate the deflecting prism 4 about the optical axis at a speed of the prescribed rotational period T.

Figure 6:
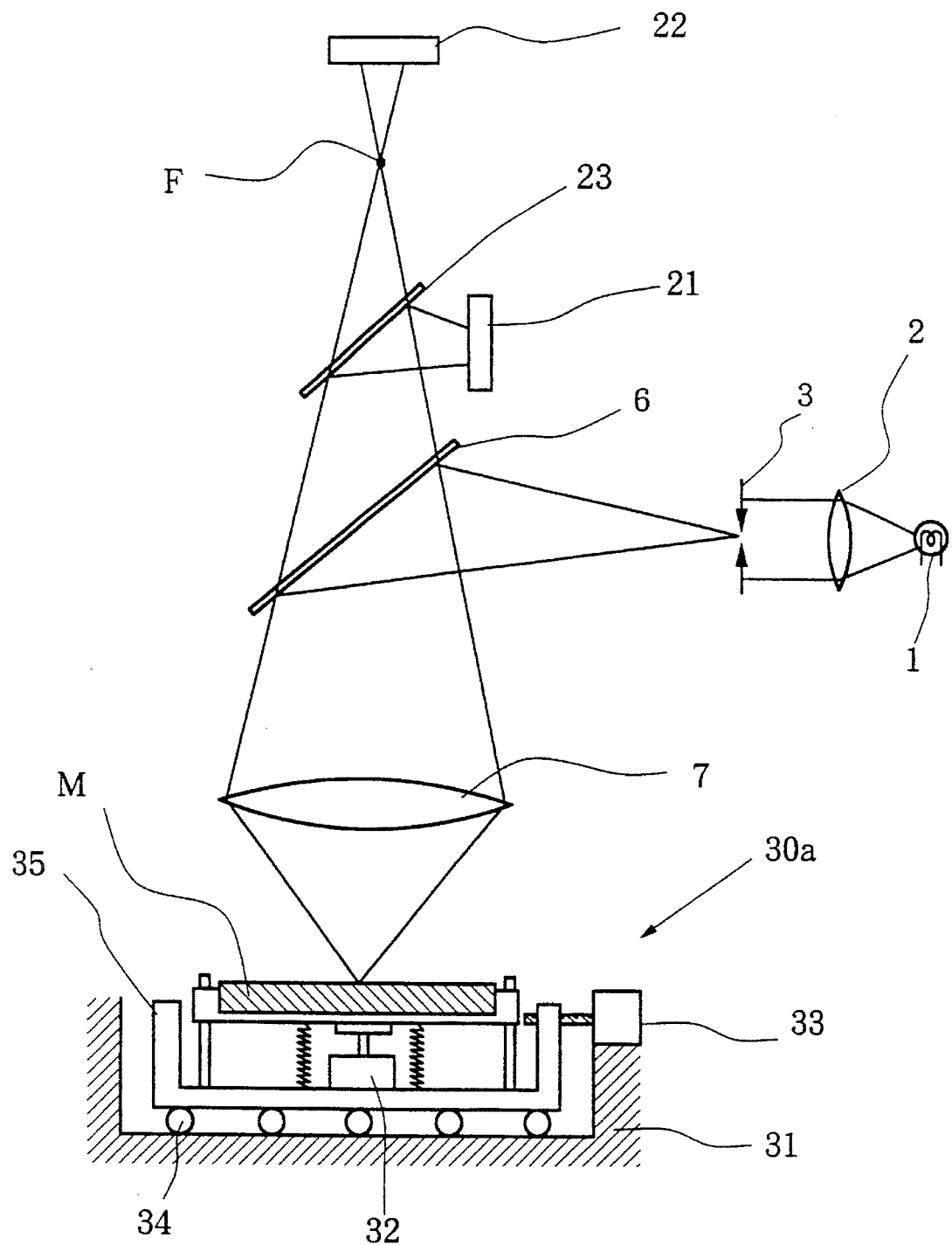
FIG. 6 is a diagram showing a second embodiment of this invention.

Next, the second embodiment of this invention will be explained with reference to FIG. 6. In the figure, component parts identical to those of FIG. 1 are referred to by the common symbols, and the difference of this embodiment from the one shown in FIG. 1 will mainly be explained in the following.

The second embodiment does not include the deflecting prism 4 used in the first embodiment, but instead it has a stage device 30a that is movable not only along the optical axis but also on the x-y plane perpendicular to the optical axis. The movement of the object M on the x-y plane provides the same effect as the rotation of the deflecting prism 4 of the first embodiment.

A second motor 33 is used to provide the movement on the x-y plane for the chassis 35 which is supported by a bearing 34. The motor 33, bearing 34 and chassis 35 in combination function as "scanning means". The second motor 33 produces reciprocating movements of the chassis 35 having a same reciprocating distance and speed (period or frequency) and a phase difference of 90° for the x-axis direction and y-axis direction. Consequently, the light spot S formed by the light beam from the light source 1 has a circular movement at a constant angular velocity on the object M.

Figure 7:
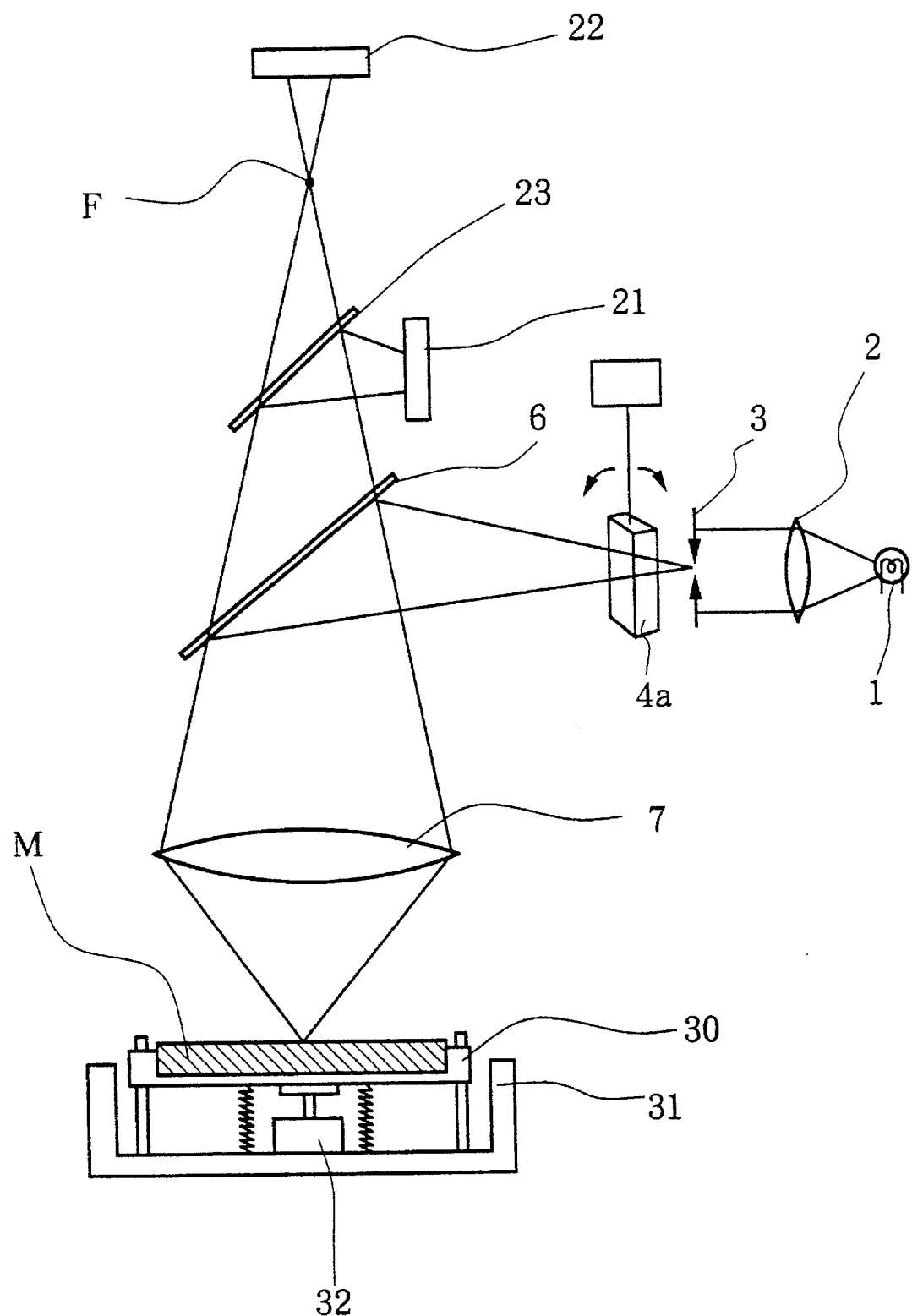
FIG. 7 is a diagram showing a third embodiment of this invention.

FIG. 7 shows the third embodiment of this invention. This embodiment includes a deflecting prism 4a which is shaped in a column with a trapezoidal cross section and adapted to turn about the axis extending vertically in the figure so that a light beam from the light source 1 is deflected in the direction (y-axis direction) perpendicular to the drawing.

A stage 30 is moved by a motor 32 in the S-axis direction (the direction perpendicular to the movement of light beam). The movement of the light beam in the y-axis direction by the deflecting prism 4 and the movement of the stage 30 in the x-axis direction are set to have the same reciprocating distance and speed (period or frequency) and a phase difference of 90°. Consequently, the light spot S formed by the light beam from the light source 1 has a circular movement at a constant angular velocity on the object M.

Next, variations of the foregoing three embodiments will be explained in brief.

In the first embodiment, the outputs of the first and second light sensors 21 and 22 are integrated so that signal components of various portions of the object M are summed thereby to obtain a sufficient accuracy of position detection, whereas it is also possible to use light sensors with signal accumulative ability such as CCD elements for the first and second light sensors 21 and 22 so that signals of various portions of the object M are accumulated for a certain time length, and the intended effectiveness of this invention is accomplished without using integration circuits.

Alternatively, it is also possible to measure the position of the object M accurately by implementing the iterative detection of reflected light beams from various portions of the objects M with the light sensors 21 and 22 and averaging the output signals, whereby the intended effectiveness of this invention is accomplished without using integration circuits.

We claim:

1. A position detecting apparatus comprising: optical projection means for projecting a light beam to form a light spot within a prescribed range on an object under test;

a first light sensor which receives a reflected light beam from said object, said first light sensor receiving the reflected light beam at a position with a prescribed distance short of a convergent position;

a second light sensor which receives the reflected light beam from said object, said second light sensor receiving the reflected light beam at a position with the prescribed distance ahead of the convergent position; and scanning means for continuously deflecting the light spot relative to said object in such a manner that the light spot moves on the object.

2. A position detecting apparatus according to claim 1 further including position determination means which determines that said object is located at the reference position if the outputs of said first and second light sensors sampled within a prescribed period of the continuous scanning of the light spot are substantially equal.

3. A position detecting apparatus according to claim 1 further including position determination means which determines that said object is located at the reference position if average values of the outputs of said first and second light sensors sampled duping the scanning of different positions of said object with the light spot are substantially equal.

4. A position detecting apparatus according to claim 1, wherein each of said first and second light sensors accumulates the amount of light received during a prescribed period of the continuous scanning of the light spot.

5. A position detecting apparatus according to claim 2, wherein said position determination means determines that said object is located at the reference position if the outputs of said first and second light sensors integrated within a prescribed period of the continuous scanning of the light spot by said scanning means are Substantially equal.

6. A position detecting apparatus according to claim 1, wherein said scanning means comprises a deflecting prism which is located along the light path of the light beam formed by said optical projection means and adapted to rotate.

7. A position detecting apparatus according to claim 1, wherein said scanning means comprises a moving stage which moves said object relative to said optical projection means.

8. A position detecting apparatus according to claim 1, wherein said scanning means comprises a combination of a deflecting prism which is located along on the light path of the light beam formed by said optical projection means and adapted to rotate and a moving stage which moves said object relative to said optical projection means.

9. A position detecting apparatus according to claim 1, wherein said scanning means moves the light spot relative to said object at a substantially constant speed.

10. A position detecting apparatus according to claim 1, wherein said scanning means moves the light spot relative to said object along a curving profile.

11. A position detecting apparatus according to claim 1, wherein said reference position is the focal position of the reflected light beam.

12. A position detecting apparatus according to claim 1, wherein the scanning means provides means for moving the light spot along a curving profile on the object.

13. A position detecting apparatus according to claim 1, wherein the scanning means provides means for moving the light spot on the object at a constant angular velocity.

14. A position detecting apparatus comprising:

optical projection means including a light source, a collimator lens, a pinhole plate, a half-mirror and an objective lens, said projection means forming a light beam and projecting the light beam to form a light spot on an object under test;

a first light sensor which receives a reflected light beam from said object, said first light sensor receiving the reflected light beam at a position with a prescribed distance short of a convergent position;

a second light sensor which receives the reflected light beam from said object, said second light sensor receiving the reflected light beam at a position with the prescribed distance ahead of the convergent position; and scanning means for continuously deflecting the light spot relative to said object within a prescribed range in such a manner that the light spot moves on the object.

15. A position detecting apparatus according to claim 14, wherein the Scanning means provides means for moving the light spot along a curving profile on the object.

16. A position detecting apparatus according to claim 14, wherein the scanning means provides means for moving the light spot on the object at a constant angular velocity.

17. A position detecting apparatus, comprising:

optical projection means for forming a light beam and projecting the light beam onto a test object, said projection means including a light Source, a collimator lens, and an objective lens;

light sensing means for receiving a reflected light beam from the test object when the test object is placed in a reference position, said reflected light beam passing through said objective lens and having a position of convergence, said light sensing means comprising a first light sensor positioned between said objective lens and said position of convergence for receiving the reflected light beam before the position of convergence, and a second light sensor positioned on an opposite side of the position of convergence from said objective lens for receiving the reflected light beam after the position of convergence; and scanning means for continuously deflecting the light spot relative to said test object within a prescribed range in such a manner that the light spot moves on the object.

18. The position detecting apparatus as set forth in claim 17, wherein said position of convergence is half-way between said first and second sensors.

19. A position detecting apparatus according to claim 17, wherein the Scanning means provides means for moving the light spot along a curving profile on the object.

20. A position detecting apparatus according to claim 17, wherein the scanning means provides means for moving the light spot on the object at a constant angular velocity.

* * * * *